United States Patent Office 2,813,909
Patented Nov. 19, 1957

2,813,909

POLYHALOMETHANOINDENE DERIVATIVES
OF PHENOLS

Louis Schmerling, Riverside, Ill., assignor to Universal
Oil Products Company, Des Plaines, Ill., a corporation
of Delaware No Drawing. Application October 11, 1956,
Serial No. 615,250

16 Claims. (Cl. 260—619)

This invention relates to compositions of matter which may be used as insecticides and to a method for the preparation thereof. More specifically, the invention relates to a method for the preparation of phenolic derivatives of polyhalomethanoindenes.

An object of this invention is to prepare phenolic derivatives of polyhalomethanoindenes which may be used as insecticides.

A further object of this invention is to prepare phenolic derivatives of hexachloromethanoindenes.

One embodiment of the invention is found in a process for the preparation of a phenolic derivative of a polyhalomethanoindene which comprises condensing a polyhalocycloalkadiene with a cycloalkadienylphenol and recovering the resultant condensation product.

One embodiment of the invention is found in a process for the preparation of a phenolic derivative of a polyhalomethanoindene which comprises condensing a polyhalocycloalkadiene with a cycloalkenylphenol and recovering the resultant condensation product.

A specific embodiment of the invention resides in a process for the preparation of a phenolic derivative of a hexachloromethanoindene which comprises condensing hexachlorocyclopentadiene with a cyclopentadienylphenol at a temperature in the range of from about 80° to about 180° C., and recovering the resultant condensation product.

A specific embodiment of the invention resides in a process for the preparation of a phenolic derivative of a hexachloromethanoindene which comprises condensing hexachlorocyclopentadiene with a cyclopentenylphenol at a temperature in the range of from about 80° to about 180° C., and recovering the resultant condensation products.

A more specific embodiment of the invention is found in a process for the preparation of a phenolic derivative of a hexachloromethanoindene which comprises condensing hexachloromethanoindene which comprises condensing hexachlorocyclopentadiene with p-(2,4-cyclopentadienyl)phenol at a temperature in the range of from about 80° to about 180° C., and recovering the resultant 1-(4-hydroxyphenyl)-4,5,6,7,8,8-hexachloro-3a,4,7,7a-tetrahydro-4,7-methanoindene.

A more specific embodiment of the invention is found in a process for the preparation of a phenolic derivative of a hexachloromethanoindene which comprises condensing hexachlorocyclopentadiene with p-(2-cyclopentenyl)-phenol at a temperature in the range of from about 80° to about 180° C., and recovering the resultant 1-(4-hydroxyphenyl)-4,5,6,7,8,8-hexachloro-2,3,3a,4,7,7a-hexahydro-4,7-methanoindene.

Other objects and embodiments referring to alternative polyhalocycloalkadienes and alternative cycloalkadienylphenols and cycloalkenylphenols will be found in the following further detailed description of the invention.

The phenolic derivatives of hexachloromethanoindenes which are prepared according to the process of this invention find a wide variety of uses in the chemical field. For example the condensation product of hexachlorocyclopentadiene and a cyclopentadienylphenol may be used as an insecticide, especially against houseflies.

The process of this invention in which a polyhalocycloalkadiene is condensed with an unsaturated cycloalkylphenol (that is, a cycloalkenylphenol) or a cycloalkadienylphenol will take place at a temperature in the range of from about atmospheric to about 250° C. and often preferably at a temperature in the range of from about 80° C. to about 180° C., the temperature depending upon the activity of the phenolic compound used.

This condensation reaction is illustrated by the following equation:

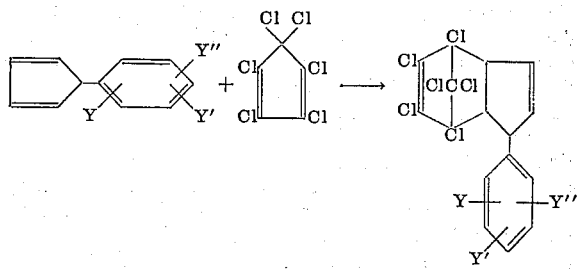

in which Y, Y' and Y" are independently selected from the group consisting of alkyl, hydroxy and hydrogen radicals, at least one radical being hydroxy. If an excess of the hexachlorocyclopentadiene is used, further condensation at the double bond of the unchlorinated ring of the product may occur.

Similarly, the reaction with a cyclopentenylphenol is illustrated by the following equation:

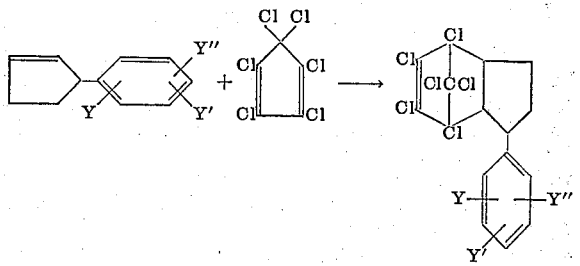

in which Y, Y' and Y" have the above-mentioned significance.

If so desired, the process may be effected in the presence of inert organic solvents including alcohols such as methanol and ethanol; aromatic hydrocarbons such as benzene, toluene, xylenes, etc., and aliphatic hydrocarbons such as pentane, hexane, heptane, etc.

Suitable cycloalkadienylphenols which may be used in this invention include p-(2,4-cyclopentadienyl)phenol, 4-(2,4-cyclopentadienyl)-2,6-dimethylphenol, p-(2,5-cyclopentadienyl)phenol, 4-(2,5-cyclopentadienyl)-2,6-dimethylphenol, p-(1,3-cyclopentadienyl)phenol, 4-(1,3-cyclopentadienyl)-2,6-dimethylphenol, 4-(2,4-cyclopentadienyl)-2-methylphenol, 4-(2,5-cyclopentadienyl)-2-methylphenol, 4-(1,3-cyclopentadienyl)-2,6-dimethylphenol, 4-(2,4-cyclopentadienyl)-2,6-diethylphenol, 4-(2,5-cyclopentadienyl)-2,6-diethylphenol, 4-(1,3-cyclopentadienyl)-2,6-diethylphenol, 4-(2,4-cyclopentadienyl)-catechol, etc. It is understood that the above enumerated cyclopentadienylphenols are only representatives of the class of compounds which may be used and that the process of this invention is not necessarily limited thereto.

Suitable cycloalkenylphenols include p-(1-cyclopentenyl)phenol, m-(1-cyclopentenyl)phenol, o-(1-cyclopentenyl)phenol, p-(2-cyclopentenyl)phenol, m-(2-cyclopentenyl)phenol, o-(2-cyclopentenyl)phenol, p-(3-cyclopentenyl)phenol, 5-(3-cyclopentenyl)-2,4-dimethylphenol, 2-(3-cyclopentenyl)-4,6-dimethylphenol, 4-(2-cyclopentenyl)-2,6-diethylphenol, 4-(1-cyclopentenyl)catechol, 4-(2-cyclopentenyl)-2-methylphenol, etc. It is understood that the above enumerated cyclopentadienylphenols are only repersentatives of the class of compounds which may be used and that the process of this invention is not necessarily limited thereto.

Polyhalocycloalkadienes which may be condensed with the aforementioned cyclopentadienylphenols include 1,2-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene, 1,2-dibromocyclopentadiene, 1,2,3-tribromocyclopentadiene, 1,2,3,4-tetrabromocyclopentadiene, 1,2,3,4,5-pentabromocyclopentadiene, hexabromocyclopentadiene, 1,2-difluorocyclopentadiene, 1,2,3-trifluorocyclopentadiene, 1,2,3,4-tetrafluorocyclopentadiene, 1,2,3,4,5-pentafluorocyclopentadiene, hexafluorocyclopentadiene, etc. In addition it is also contemplated within the scope of this invention that the cyclopentadienes which are used in this process may contain more than one species of halogen substituents, although the use of these compounds will not necessarily have equivalent results.

The physical properties of the present phenolic derivatives of polyhalomethanoindenes and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example, in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise a batch or continuous type operation. For example, when a batch-type operation is used, a quantity of the starting materials comprising an unsaturated cycloalkylphenol and, if so desired, an inert organic solvent are placed in a condensation apparatus provided with heating and mixing means. The flask is adjusted to the desired temperature and the polyhalocyclopentadiene is added at a predetermined rate for a predetermined residence time. At the end of this time the flask and the contents thereof, are allowed to cool to room temperature and the desired reaction product separated from unreacted starting materials by conventional means such as fractional distillation, crystallization, etc. Alternatively, the reactants and solvent, if any, may be mixed and then heated to the desired reaction temperature.

Another method of effecting the condensation reaction of the present invention is by a continuous type operation. In this type of operation the starting materials comprising the unsaturated cycloalkylphenol and the polyhalocyclopentadiene are continuously charged to a reactor which is maintained in the proper operating conditions of temperature and pressure. The reactor may comprise an unpacked vessel or coil or may contain an adsorbent packing material such as fire brick, alumina, dehydrated bauxite, or the like. If so desired, an inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and purified by conventional means hereinbefore set forth, while the unreacted starting materials are separated and recharged to the reactor as a portion of the feedstock.

The following examples are given to illustrate the process of the present invention which, however, are not intended to limit the generally broad scope of the present invention in strict accordance thereto.

*Example I*

80 g. of p-(2,4-cyclopentadienyl)phenol is added to 250 cc. of toluene in a glass condensation flask provided with stirring and heating means. 135 g. of hexachlorocyclopentadiene is gradually added during a period of about one-half hour to the continuously stirred contents of the flask while the temperature is raised to approximately 120° C. and maintained thereat. Stirring is continued for an additional two hours at the end of which time the flask and contents thereof are allowed to return to room temperature. The reaction mixture is subjected to fractional distillation at reduced pressure and the desired product comprising 1-(4-hydroxyphenyl)-4,5,6,7,8,8-hexachloro-3a,4,7,7a-tetrahydro-4,7-methanoindene is separated therefrom.

An insecticidal solution is prepared by dissolving 1 g. of the above mentioned compound in 2 cc. of benzene and adding 100 cc. of water using Triton X–100 as an emulsifying agent. This solution is sprayed into a cage containing common houseflies and causes a 100% knockdown.

*Example II*

A solution of 135 g. of hexachlorocyclopentadiene and 95 g. of 4-(2,4-cyclopentadienyl)-2,6-dimethylphenol in 200 cc. of xylene is heated under reflux for a period of about three hours at the end of which time the flask content is subjected to fractional distillation under reduced pressure. The desired product, comprising 1-(4-hydroxy-3,5 - dimethylphenyl) - 4,5,6,7,8,8 - hexachloro-3a,4,7,7a-tetrahydro-4,7-methanoindene, is separated therefrom.

*Example III*

A solution of 135 g. of hexachlorocyclopentadiene and 80 g. of p-(2-cyclopentenyl)phenol in 200 cc. of xylene is heated under reflux for six hours and the product is treated as described for the product of Example II. There is thus obtained 1-(4-hydroxyphenyl)-4,5,6,7,8,8-hexachloro-1,2,3a,4,7,7a-hexahydro-4,7-methanoindene.

I claim as my invention:

1. A process for the preparation of a phenolic derivative of a polyhalomethanoindene which comprises condensing a polyhalocycloalkadiene with an unsaturated cycloalkylphenol, and recovering the resultant condensation product.

2. A process for the preparation of a phenolic derivative of a polyhalomethanoindene which comprises condensing a polyhalocycloalkadiene with a cycloalkadienylphenol at a temperature in the range of from about atmospheric to about 250° C., and recovering the resultant condensation product.

3. A process for the preparation of a phenolic derivative of a polyhalomethanoindene which comprises condensing a polyhalocycloalkadiene with a cycloalkenylphenol at a temperature in the range of from about atmospheric to about 250° C., and recovering the resultant condensation product.

4. A process for the preparation of a phenolic derivative of a polyhalomethanoindene which comprises condensing a polyhalocycloalkadiene with a cyclopentadienylphenol at a temperature in the range of from about 80° to about 180° C., and recovering the resultant condensation product.

5. A process for the preparation of a phenolic derivative of a polyhalomethanoindene which comprises condensating a polyhalocycloalkadiene with a cyclopentenylphenol at a temperature in the range of from about 80° to about 180° C., and recovering the resultant condensation product.

6. A process for the preparation of a phenolic derivative of a polychloromethanoindene which comprises condensing a polychlorocycloalkadiene with a cyclopentadienylphenol at a temperature in the range of from about 80° to about 180° C., and recovering the resultant condensation product.

7. A process for the preparation of a phenolic derivative of a polychloromethanoindene which comprises condensing a polychlorocycloalkadiene with a cyclopentenylphenol at a temperature in the range of from about 80° to about 180° C., and recovering the resultant condensation product.

8. A process for the preparation of a phenolic derivative of a hexachloromethanoindene which comprises condensing a hexachlorocyclopentadiene with a cyclopentadienylphenol at a temperature in the range of from about 80° to about 180° C., and recovering the resultant condensation product.

9. A process for the preparation of a phenolic derivative of a hexachloromethanoindene which comprises condensing a hexachlorocyclopentadiene with a cyclopentenylphenol at a temperature in the range of from about 80° to about 180° C., and recovering the resultant condensation product.

10. A process for the preparation of a phenolic derivative of a hexachloromethanoindene which comprises condensing hexachlorocyclopentadiene with p-(2,4-cyclopentadienyl)-phenol at a temperature in the range of from about 80° to about 180° C., and recovering the resultant 1 - (4 - hydroxyphenyl) - 4,5,6,7,8,8-hexachloro-3a,4,7,7a-tetrahydro-4,7-methanoindene.

11. A process for the preparation of a phenolic derivative of a hexachloromethanoindene which comprises condensing hexachlorocyclopentadiene with p-(2,4-cyclopentadienyl)-2,6-dimethylphenol at a temperature in the range of from about 80° to about 180° C., and recovering the resultant 1-(4-hydroxy-3,5-dimethylphenyl)-4,5,-6,7,8,8 - hexachloro - 3a,4,7,7a-tetrahydro-4,7-methanoindene.

12. A process for the preparation of a phenolic derivative of a hexachloromethanoindene which comprises condensing hexachlorocyclopentadiene with p-(2-cyclopentenyl)-phenol at a temperature in the range of from about 80° to about 180° C., and recovering the resultant 1-(4-hydroxyphenyl) - 4,5,6,7,8,8 - hexachloro - 1,2,3a,4,7,7a-hexahyro-4,7-methanoindene.

13. A phenolic derivative of a polyhalomethanoindene.

14. 1 - (4 - hydroxyphenyl) - 4,5,6,7,8,8 - hexachloro-3a,4,7,7a-tetrahydro-4,7-methanoindene.

15. 1 - (4 - hydroxy - 3,5 - dimethylphenyl)-4,5,6,7,8,8-hexachloro-3a,4,7,7a-tetrahydro-4,7-methanoindene.

16. 1 - (4 - hydroxyphenyl) - 4,5,6,7,8,8 - hexachloro-1,2,3a,4,7,7a-hexahydro-4,7-methanoindene.

References Cited in the file of this patent
UNITED STATES PATENTS

| 2,584,140 | Segel et al. | Feb. 5, 1952 |
| 2,616,930 | Schmerling | Nov. 4, 1952 |

OTHER REFERENCES

Bader: Jour. Amer. Chem. Soc., vol. 75 (1953), pp. 5967–69.